United States Patent
Yoo et al.

(10) Patent No.: US 7,116,627 B2
(45) Date of Patent: Oct. 3, 2006

(54) COMPATIBLE OPTICAL PICKUP DEVICE USING A SINGLE LIGHT SOURCE

(75) Inventors: Jang-hoon Yoo, Seoul (KR); Seung-tae Jung, Gyeonggi-do (KR); Ho-cheol Lee, Gyeonggi-do (KR); Ju-hyung Lee, Gyeonggi-do (KR); Chul-woo Lee, Gyeonggi-do (KR); Young-il Kim, Gyeonggi-do (KR); Hyun-seob Choi, Gyeonggi-do (KR); Sang-beom Hong, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1026 days.

(21) Appl. No.: 09/899,501

(22) Filed: Jul. 6, 2001

(65) Prior Publication Data

US 2004/0090900 A1 May 13, 2004

(30) Foreign Application Priority Data

Jul. 8, 2000 (KR) .............................. 2000-39091
Jul. 4, 2001 (KR) .............................. 2001-39757

(51) Int. Cl.
*G11B 7/00* (2006.01)
(52) U.S. Cl. .......................... 369/112.01; 369/44.23
(58) Field of Classification Search ........... 369/112.01, 369/112.1, 112.08, 112.05, 112.13, 112.2, 369/112.26, 112.03, 44.23, 44.24
See application file for complete search history.

(56) References Cited

U.S. PATENT DOCUMENTS

| | | | |
|---|---|---|---|
| 5,446,565 A | 8/1995 | Komma et al. | |
| 6,043,912 A | 3/2000 | Yoo et al. | |
| 6,088,322 A | 7/2000 | Broome et al. | |
| 6,091,691 A | 7/2000 | Yoo et al. | |
| 6,118,594 A | 9/2000 | Maruyama | |
| 6,198,714 B1 | 3/2001 | Yoo et al. | |
| 6,259,668 B1* | 7/2001 | Lee et al. | 369/112.26 |

(Continued)

FOREIGN PATENT DOCUMENTS

CN 1198567 11/1998

(Continued)

OTHER PUBLICATIONS

Chinese Patent Publication No. 1198567 corresponds to U. S. Patent No. 6,198,714.

*Primary Examiner*—Nabil Hindi
(74) *Attorney, Agent, or Firm*—Stein, McEwen & Bui, LLP

(57) ABSTRACT

A compatible optical pickup device includes a single light source to emit a light having a wavelength longer than 650 nm, an objective lens having a near axis area, a ring type annular lens area, and a far axis area to focus the light to form light spots suitable for a first relatively thin optical disk and a second relatively thick optical disk to form a first light spot having an FWHM (full width at half maximum) of 0.72 μm or less for the first optical disk and a second light spot having an FWHM of 0.8 μm or more for the second optical disk, an optical path changer to change a proceeding path of incident light, and a photodetector to receive light reflected by the optical disk and having passed through the objective lens and the optical path changer and to detect an information signal and/or an error signal.

17 Claims, 11 Drawing Sheets

U.S. PATENT DOCUMENTS 6,480,344 B1 11/2002 Maruyama
6,898,168 B1 * 5/2005 Kimura et al. ......... 369/112.01

FOREIGN PATENT DOCUMENTS

| EP | 0 776 002 | 5/1997 |
| EP | 0 805 440 | 11/1997 |
| EP | 0 838 812 | 4/1998 |
| EP | 0 865 037 | 9/1998 |
| EP | 0 921 521 | 6/1999 |
| JP | 19700504 | 8/1997 |
| JP | 10-021638 | 1/1998 |
| JP | 10-69675 | 3/1998 |
| JP | 10069675 | 3/1998 |
| JP | 10143905 | 5/1998 |
| JP | 11086319 | 3/1999 |
| JP | 11096585 | 4/1999 |
| JP | 11-339306 | 12/1999 |
| JP | 2000028917 | 1/2000 |

* cited by examiner

COMPATIBLE OPTICAL PICKUP DEVICE USING A SINGLE LIGHT SOURCE

CROSS-REFERENCE TO RELATED APPLICATIONS

This application claims the benefit of Korean Application Nos. 2000-39091 and 2001-39757, filed respectively on Jul. 8, 2000 and Jul. 4, 2001, in the Korean Industrial Property Office, the disclosures of which are incorporated herein by reference.

BACKGROUND OF THE INVENTION

1. Field of the Invention

The present invention relates to a compatible optical pickup device which can compatibly read/write optical disks of the CD family or DVD family, and more particularly, to a compatible optical pickup device using a single light source to emit light having a wavelength longer than 650 nm.

2. Description of the Related Art

A typical optical pickup device reproduces and records information on and/or from a recording medium in a non-contact manner. An optical pickup device capable of performing reproducing/recording of optical disks of the DVD family having a thickness of 0.6 mm (hereinafter referred to as "DVD") uses an objective lens having a numerical aperture of 0.6 and a light source to emit light having a 650 nm wavelength. Here, the optical pickup device for DVD should be compatible with optical disks of a CD family which is 1.2 mm thick (hereinafter referred to as "CD").

In consideration of the above matter, optical pickup devices which can compatibly reproduce/record optical disks in different formats have been suggested. A conventional optical pickup which can compatibly reproduce/record a CD and a DVD is shown in FIG. 1 and has the structure using two light sources 1 and 3 to emit light having different wavelengths.

Referring to FIG. 1, a first light source 1 emits light having 635 or 650 nm to reproduce/record a DVD 10$a$, which is relatively thin. A second light source 3 emits light having a 780 nm wavelength to reproduce/record a CD 10$b$, which is relatively thick. A grating 5 diffracts and splits light output from the second light source 3 into the 0$^{th}$ order and the ±1$^{st}$ order rays to detect a tracking error signal by a three-beam method during reproducing/recording of the CD 10$b$. The light emitted from the first light source 1 passes through a first beam splitter 7 and is reflected by a second beam splitter 9 so as to proceed toward the DVD 10$a$. The light emitted from the second light source 3 is sequentially reflected by the first and second beam splitters 7 and 9 and proceeds toward the CD 10$b$. A collimating lens 11 converts the divergent light output from the first and second light sources 1 and 3 into a parallel beam. An objective lens 15 focuses incident light output from the first and second light sources 1 and 3 to form a light spot. Here, the light emitted from the first light source 1 is focused on the relatively thin DVD 10$a$ while the light emitted from the second light source 3 is focused on the relatively thick CD 10$b$.

The light reflected by an optical disk 10 is incident on the second beam splitter via the objective lens 15. Most of the light passes through the second beam splitter 9 and is received by a photodetector 19 after passing through a sending lens 17 to focus the incident light reflected by the optical disk 10.

Since the conventional compatible optical pickup device having the above structure includes two light sources 1 and 3 emitting light having different wavelengths, optical disks 10 of both the CD 10$b$ family and the DVD 10$a$ family can be reproduced/recorded.

However, since the conventional compatible optical pickup device uses two separate light sources, a cost of manufacturing is high and the structure thereof is complicated, and further, assembly and optical arrangement is difficult. Further, the light source 1 for a 635 nm or 650 nm wavelength which can emit recording power for DVD-R and/or DVD-RAM is expensive, which increases the entire cost of a compatible optical pickup device.

SUMMARY OF THE INVENTION

To solve the above and other problems, it is an object of the present invention to provide an inexpensive compatible optical pickup device using a single light source to emit light having a wavelength longer than 650 nm so that an optical disk of the CD family and the DVD family can be compatibly reproduced/recorded.

Additional objects and advantages of the invention will be set forth in part in the description which follows and, in part, will be obvious from the description, or may be learned by practice of the invention.

Accordingly, to achieve the above and other objects, there is provided a compatible optical pickup device according to an embodiment of the present invention comprises a single light source to emit a light having a wavelength longer than 650 nm, an objective lens having a near axis area, a ring type annular lens area, and a far axis area with respect to an apex to focus the light emitted from the light source to form light spots suitable for a first optical disk which is relatively thin and a second optical disk which is relatively thick, so as to form a light spot having an FWHM (full width at half maximum) of 0.72 μm or less with respect to the first optical disk and a light spot having an FWHM greater than or equal to 0.8 μm with respect to the second optical disk, an optical path changer arranged on the optical path between the light source and the objective lens to change a path of incident light, and a photodetector to receive light reflected by the optical disk passed through the objective lens and the optical path changer and to detect an information signal and/or error signal.

According to another embodiment of the present invention, a compatible optical pickup device comprises a single light source to emit a light having a wavelength longer than 650 nm, an objective lens having a near axis area, a ring type annular lens area, and a far axis area with respect to an apex to focus light emitted from the light source to form light spots suitable for a first optical disk which is relatively thin and a second optical disk which is relatively thick, and having an effective numerical aperture greater than or equal to 0.63 with respect to the first optical disk and an effective numerical aperture less than or equal to 0.53 with respect to the second optical disk, an optical path changer arranged on the optical path between the light source and the objective lens to change a path of the incident light, and a photodetector to receive the light reflected by the optical disk and passed through the objective lens and the optical path changer and to detect an information signal and/or error signal.

According to an aspect of the present invention, the first optical disk is an optical disk of a DVD family and the second optical disk is an optical disk of a CD family.

According to another aspect of the present invention, the light source emits light having a wavelength between 680–780 nm.

According to yet another aspect of the present invention, the annular lens area of the objective lens is optimized to the second optical disk so that, when the first optical disk is to be reproduced/recorded, a light spot of light passing through the near axis area and the far axis area is focused on the information recording surface of the first optical disk, while, when the second optical disk is to be reproduced/recorded, a light spot of light passing through the near axis area and the annular lens area is focused on the information recording surface of the second optical disk.

According to still another aspect of the present invention, the optical path changer comprises a polarization hologram element to diffract incident light to the $0^{th}$ order ray, or $+1^{st}$ order and/or $-1^{st}$ order rays according to a linear polarization component thereof, and a wave plate to change a polarization of the incident light.

According to a further aspect of the present invention, the optical path changer comprises a beam splitter arranged between the light source and the objective lens to transmit and/or reflect incident light.

According to a yet further aspect of the present invention, the beam splitter is provided to transmit or reflect incident light according to the polarization of the incident light, and a wave plate to change the polarization of the incident light is provided between the beam splitter and the objective lens.

BRIEF DESCRIPTION OF THE DRAWINGS

The above other objects and advantages of the present invention will become more apparent and more readily appreciated from the following description of the preferred embodiments thereof with reference to the attached drawings in which.

DETAILED DESCRIPTION OF THE PREFERRED EMBODIMENTS

Figure 1:
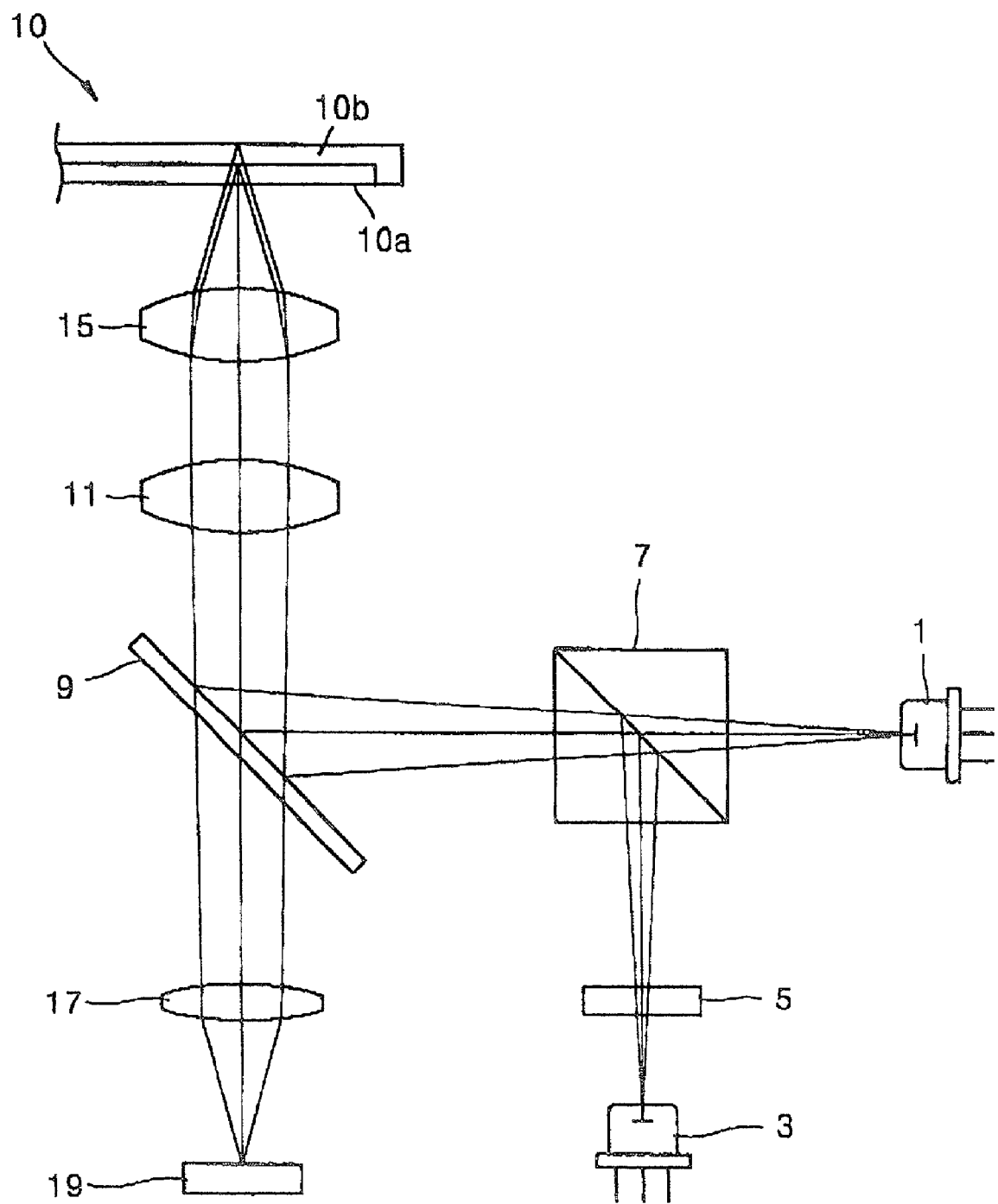
FIG. 1 schematically shows the optical arrangement of a conventional compatible optical pickup device.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 2:
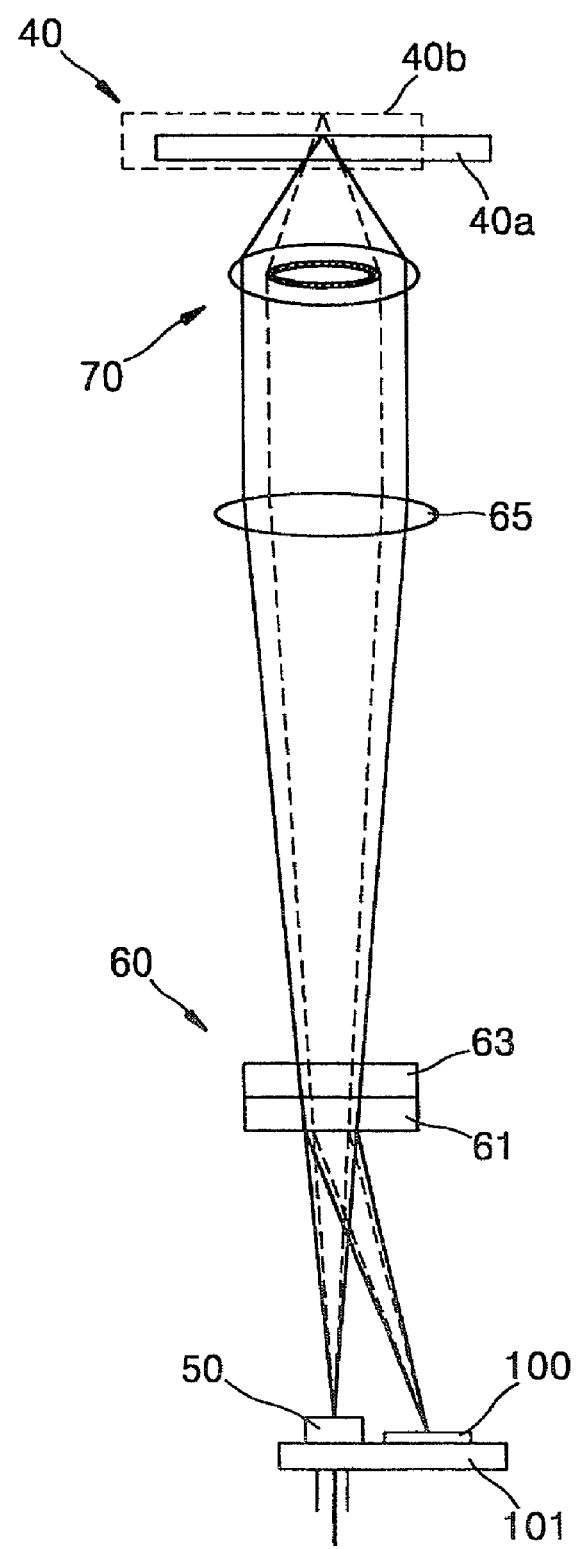
FIG. 2 schematically shows the optical arrangement of a compatible optical pickup device using a single light source according to an embodiment of the present invention.

Referring to FIG. 2, a compatible optical pickup device according to an embodiment of the present invention includes a single light source 50 to emit a light having a wavelength longer than 650 nm, an objective lens 70 mounted and driven on an actuator (not shown) to focus and track so as to control the formation of a light spot suitable for each of the first and second optical disks 40a and 40b having different thicknesses by focusing the light output from the light source 50, an optical path changer 60 disposed on an optical path between the light source 50 and the objective lens 70 to change a proceeding path of the incident light, and a photodetector 100 to receive the light reflected by an optical disk 40. Here, the first optical disk 40a is an optical disk of the DVD family which is relatively thin and the second optical disk 40b is an optical disk of the CD family which is relatively thick.

As shown, the light source 50 is a semiconductor laser that emits a light of a high optical power (i.e., an edge emitting laser or a vertical cavity surface emitting laser) to be used not only for reproducing information signals, but also for recording information signals. The light source 50 emits light having a wavelength longer than 650 nm, for example, a wavelength between 660 nm through 790 nm. As shown, the light source 50 emits light having a wavelength between 680 nm through 780 nm.

Here, with respect to a recording optical power for a DVD-R and/or DVD-RAM, the unit cost of production of a semiconductor laser for a wavelength longer than 650 nm is much lower than that of a semiconductor laser for a 650 nm wavelength. Thus, according to the present invention, the unit cost of production of the light source 50 can be drastically reduced. For example, when a 680 nm semiconductor laser is used as the light source 50, since the unit cost of production of the 680 nm semiconductor laser is much lower than a 650 nm semiconductor laser used as a general light source for a DVD, the unit cost of production of the compatible optical pickup device according to the present invention can be drastically reduced.

When the light source 50 is a semiconductor laser that emits a light having a wavelength over 750 nm, the cost of the compatible optical pickup device according to the present invention can be lowered, and simultaneously a CD-R which is currently commercialized can be compatibly reproduced/recorded. Specifically, since the currently commercialized CD-R has an organic pigment film recording layer having a large absorptivity with respect to light having a wavelength less than 750 nm, in order to reproduce/record the CD-R, a light source that emits a light having a wavelength equal to or greater than 750 nm is needed to prevent the destruction of recorded data due to a difference in sensitivity. Of course, it is understood that if the CD-R is manufactured to have a small absorptivity with respect to the light having a wavelength equal to or less than 750 nm, the compatible optical pickup device according to the present invention can compatibly reproduce/record CD-Rs regardless of a wavelength range of the used light source 50.

Since a CD-R has a recording layer which is a organic pigment film having a large absorption rate with respect to light having a wavelength less than or equal to 750 nm, to use the CD-R, a light source is needed that emits light having a wavelength greater than or equal to 750 nm to prevent damage to recorded data due to the difference of sensitivity. As such, if the light source 50 is a semiconductor laser that emits light having a wavelength less than or equal to 770 nm (preferably 760±10 nm), the compatible optical pickup device according to the present invention can be manufactured at a low cost and simultaneously be compatible with currently commercialized CD-Rs and DVD-Rs regardless of the type of organic pigment used therein.

Figure 3:
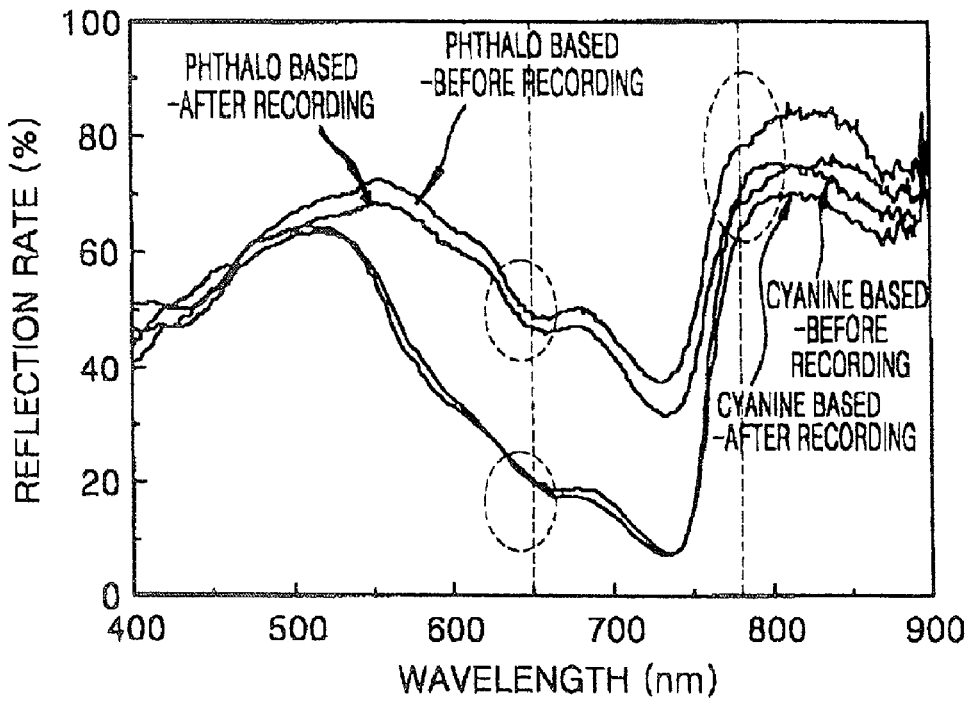
FIG. 3 is a graph schematically showing reflectance rates as a function of wavelength before and after recording of cyanine based CD-R and phthalo based CD-R, which are currently known.
Figure 4:
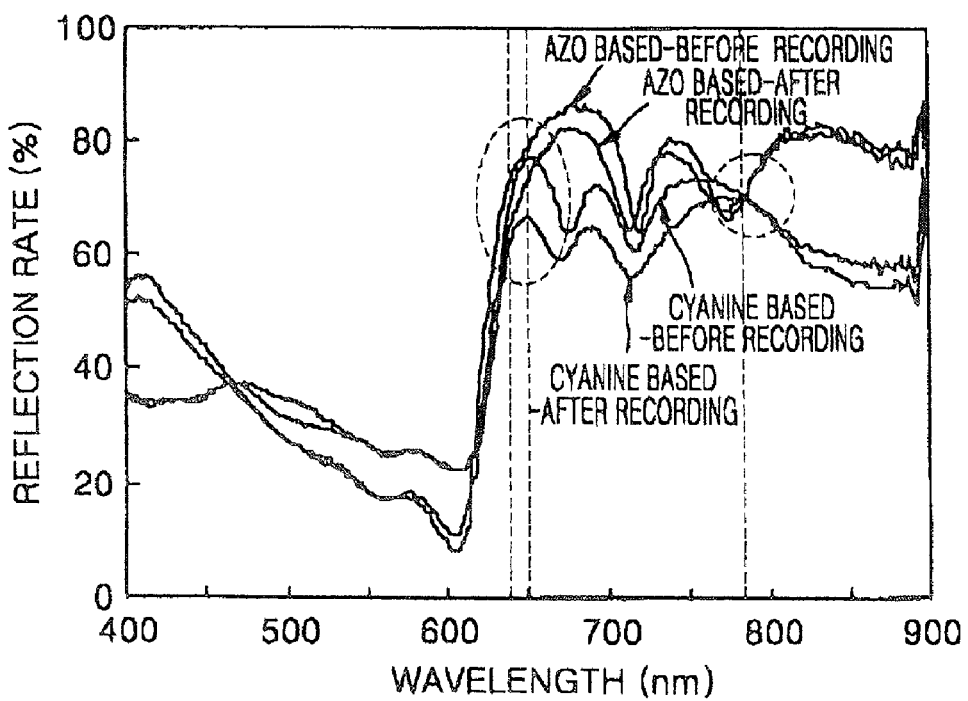
FIG. 4 is a graph schematically showing reflectance rates as a function of wavelength before and after recording of azo based DVD-R and cyanine based DVD-R, which are currently known.

As shown in FIGS. 3 and 4, the currently commercialized CD-Rs and DVD-Rs are different in the absorption rate depending on the type of organic pigment film used therein. That is, as shown in FIG. 3, a cyanine-based CD-R and a phthalo-based CD-R, which are currently commercialized, are optimized to exhibit a large difference in the reflection rate before and after recording with respect to a wavelength of 780 nm. The difference in the reflection rate before and after recording according to the wavelength is characteristically different with respect to the organic pigment used therefor. In particular, the CD-R has a great absorption rate with respect to light having a wavelength less than or equal to 750 nm. Thus, to use the CD-R, there is a need to use a light source that emits light having a wavelength greater than or equal to 750 nm to prevent damage to recorded data due to the difference in sensitivity.

As shown in FIG. 4, an azo-based DVD-R and a cyanine-based DVD-R, which are currently commercialized, are optimized to exhibit a large difference in the reflection rate before and after recording with respect to a wavelength of 650 nm. As with the CD-R, the difference in the reflection rate before and after recording according to the wavelength is characteristically different with respect to the organic pigment used therefor. In particular, in the azo-based DVD-R, the reflection rate is reversed in a wavelength area longer than about 770 nm. That is, the reflection rate before recording either becomes less than the reflection rate after recording, or the difference in the reflection rate before and after recording is approximately 0. Thus, as shown in FIGS. 3 and 4, considering the feature of the reflection rate before and after recording of a DVD-R and a CD-R according to the type of organic pigment and the feature of the absorption rate of a CD-R, when the light source 50 emits light having a wavelength which is longer than 750 nm and shorter than 770 nm (e.g., a wavelength of 760 nm), a CD-R and a DVD-R can be compatibly used regardless of the type of organic pigment in use.

However, when a CD-R is manufactured to have a less absorption rate with respect to light having a wavelength less than or equal to 750 nm, the compatible optical pickup device according to the present invention can compatibly use a CD-R regardless of the wavelength range of the light source 50 used. Also, for example, when an azo-based DVD-R is manufactured such that a reflection rate thereof is not reversed with respect to light having a wavelength greater than or equal to 770 nm, or the difference in the reflection rate before and after recording is great, the compatible optical pickup device according to the present invention can compatibly use a DVD-R regardless of the wavelength range of the light source in use.

When a semiconductor laser is provided as the light source 50, the light source 50 emits linearly polarized light approximately in one direction. Thus, the optical path changer 60 comprises a holographic beam splitter having a polarization hologram element 61 to diffract incident light into a $0^{th}$ order ray, or a $+1^{st}$ order and/or the $-1^{st}$ order rays according to a linear polarization component, and a wave plate 63 to convert the polarization of the incident light. In this case, most of the light emitted from the light source 50 proceeds toward the optical disk 40 while most of the light reflected by the optical disk 40 is received by the photodetector 100, so that the efficiency in use of the light is high.

The polarization hologram element 61 is preferably arranged to diffract the light output from the light source 50 and linearly polarize the light in one direction into the $0^{th}$ order ray. Preferably, the wave plate 63 is a quarter wave plate with respect to the wavelength of the light emitted from the light source 50 and is arranged to convert the linearly polarized light output from the light source 50 to a circularly polarized light. Thus, the light output from the light source 50 and linearly polarized light in one direction is diffracted into the $0^{th}$ order ray by the polarization hologram element 61, converted to one circularly polarized light while passing through the wave plate 63, and focused on the information recording surface of the optical disk 40 by the objective lens 70. The focused light is reflected by the information recording surface of the optical disk 40 and converted to another circularly polarized light. The another circularly polarized light is converted to light linearly polarized in the other direction while passing through the wave plate 63 and diffracted into the $+1^{st}$ order and/or $-1^{st}$ order rays by the polarization hologram element 61, and proceeds toward the photodetector 100. The photodetector 100 receives light reflected by the optical disk 40 and having passed through the objective lens 70 and the holographic beam splitter 60, and detects an information signal and/or an error signal. The photodetector 100 includes a plurality of sectional plates (not shown), each of the sectional plates independently performing photoelectric conversion to detect the information signal and/or the error signal.

When the optical path changer 60 is the holographic beam splitter, since the photodetector 100 can be installed on a base 101 where the light source 50 is installed, the photodetector 100 and the light source 50 can be modularized. Here, the holographic beam splitter 60 has a holographic device (not shown) by which most of the light output from the light source 50 is diffracted into the $0^{th}$ order ray, and most of the light reflected from the optical disk 40 is diffracted into the $+1^{st}$ order ray and/or $-1^{st}$ order ray to be received by the photodetector 100.

The collimating lens 65 forms an indefinite optical system by changing the divergent light output from the light source 50 to a parallel light. The collimating lens 65 is preferably arranged between the optical path changer 60 and the objective lens 70. In this case, the collimating lens 65 converts the divergent light output from the light source 50 to a parallel light and, simultaneously, the light reflected by the optical disk 40 and incident thereon to a focused light to proceed toward the photodetector 100.

Figure 5:
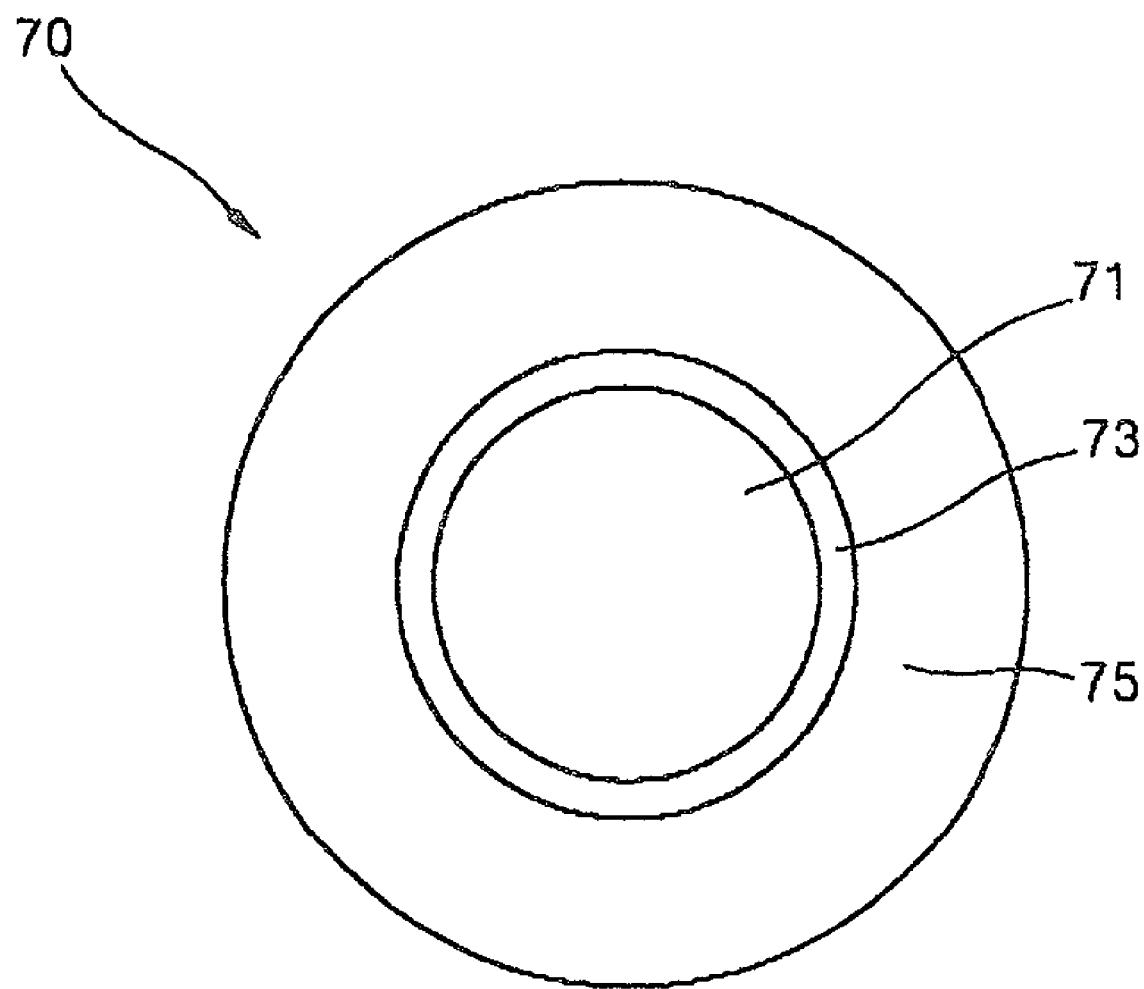
FIG. 5 is a plan view of the objective lens according to an embodiment of the present invention of FIG. 2.

As shown in FIG. 5, the objective lens 70 has a near axis area 71, a ring type annular lens area 73, and a far axis area 75 with respect to an apex. Here, the apex is a point at the intersection of the central axis of the objective lens 70 and the surface of the objective lens 70. The annular lens area 73 is an area on which light of an intermediary area between the near axis area 71 and the far axis area 75 is incident, which is formed to be an oval ring or circular ring type on the surface of the objective lens 70 facing the light source 50 or the recording medium 40.

Figure 6A:
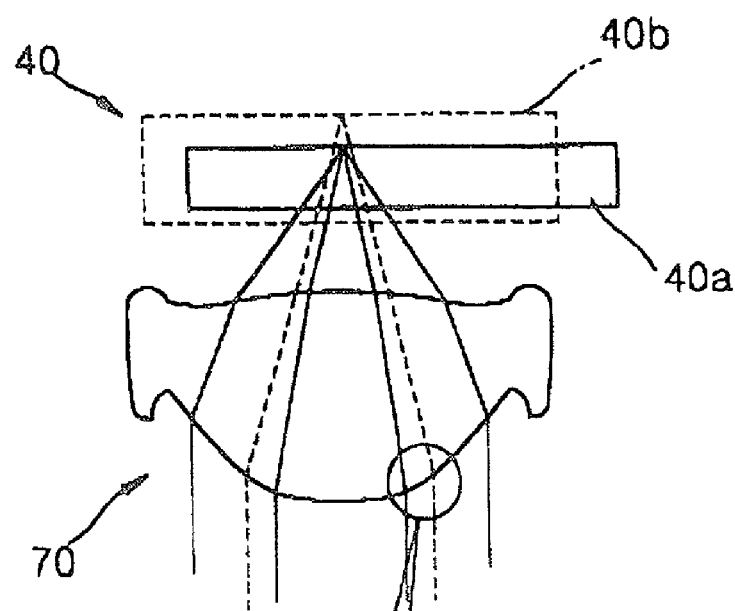
FIGS. 6A and 6B and 7A and 7B show the objective lens according to embodiments of the present invention for use in the compatible optical pickup of FIG. 2.
Figure 6B:
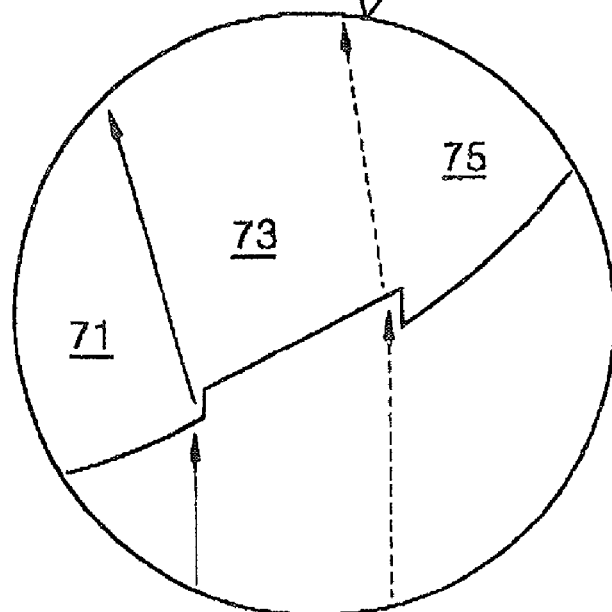

According to another embodiment of the present invention, the annular lens area 73 is formed to be aspherical as shown in FIGS. 6A and 6B and is optimized with respect to the relatively thick second optical disk 40b. If the annular lens area 71 has an aspherical shape optimized with respect to the second optical disk 40b, when the relatively thin first optical disk 40a is to be reproduced/recorded, the light emitted from the light source 50 passes through the near axis area 71 and the far axis area 75 and is thus focused on the information recording surface of the first optical disk 40a. The light which passes through the annular lens area 73 between the near axis area 71 and the far axis area 75 is so spread that this light cannot reproduce/record information to/from the information recording surface of the first optical disk 40a.

When the second optical disk 40b is used, of the light emitted from the light source 50, the light passing through the near axis area 71 and the annular lens area 73 is focused on the information recording surface of the second optical disk 40b as a light spot, while the light passing through the far axis area 75 is so spread so that it cannot be used to reproduce information from the information recording surface of the second optical disk 40b.

Figure 7A:
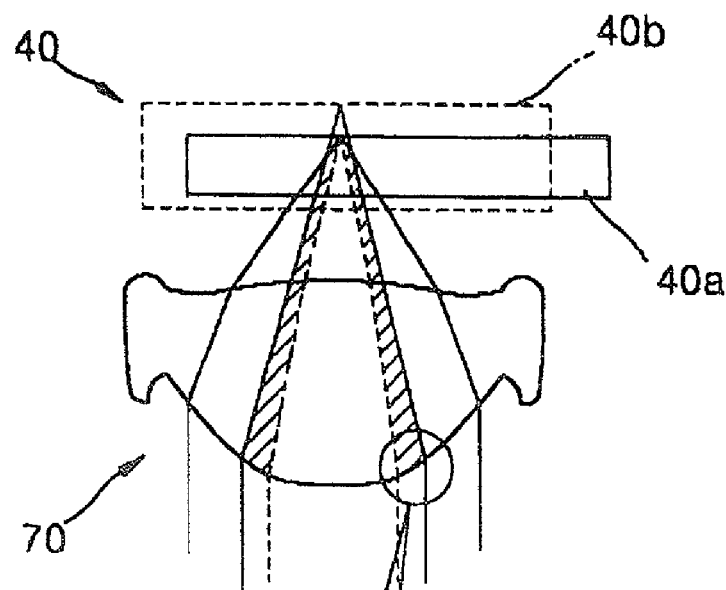
Figure 7B:
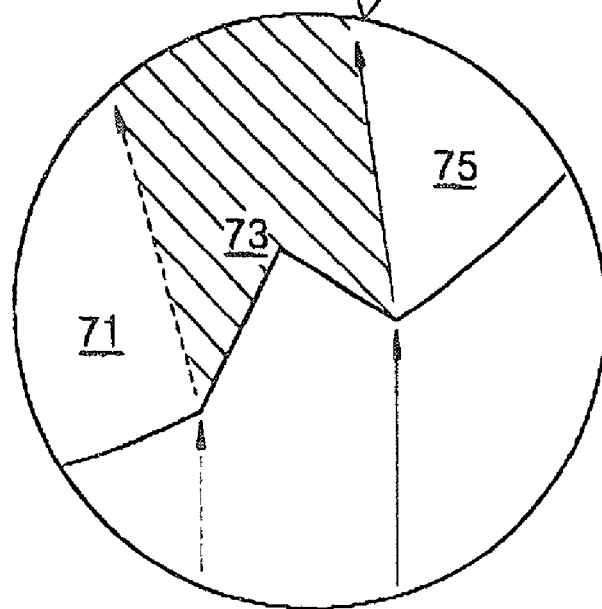

Alternatively, the annular lens area 73, as shown in FIGS. 7A and 7B, can be formed to shield or scatter incident light. In this case, when the first optical disk 40a is used, of the light emitted from the light source 50, the light passing through the near axis area 71 and the far axis area 75 is focused on the information recording surface of the first optical disk 40a as a light spot, while the light passing through the annular lens area 73 is shielded or scattered so that it cannot be focused on the information recording surface of the first optical disk 40b. Also, when the second optical disk 40b is used, of the light emitted from the light source 50, the light passing through the near axis area 71 is focused on the information recording surface of the second optical disk 40b as a light spot. In contrast, the light passing the far axis area 75 is not focused on the information recording surface of the second optical disk 40b with an intensity suitable for reproducing and/or recording, while the light passing through the annular lens area 73 is shielded or scattered so that it is not focused on the information recording surface of the second optical disk 40b.

The objective lens 70 having the structure according to the present invention is provided to focus the light output from the light source 50 so that a light spot suitable for each of the first and second optical disks 40a and 40b having different thicknesses can be formed. That is, the objective lens 70 according to the present invention preferably forms a light spot having an FWHM (full with at half maximum) equal to or less than 0.72 µm (a width which is equal to or less than 1.2 µm at $1/e^2$) with respect to the first optical disk 40a, and a light spot having an FWHM equal to or greater than 0.8 µm (a width which is equal to or greater than 1.3 µm at $1/e^2$) with respect to the second optical disk 40b.

In order to form a light spot having the above size, the objective lens 70 has a numerical aperture related to the wavelength of the light emitted from the light source 50. That is, when the light source 50 emits light having a wavelength between 680–780 nm, the objective lens 70 has an effective numerical aperture greater than or equal to 0.63 with respect to the first optical disk 40a, and an effective numerical aperture less than or equal to 0.53 with respect to the second optical disk 40b. When the light source 50 emits light having a 780 nm wavelength, the objective lens 70 preferably has an effective numerical aperture equal to or greater than 0.7 with respect to the first optical disk 40a, and an effective numerical aperture less than or equal to 0.53 with respect to the second optical disk 40b.

For example, when the light source 50 emits light having a wavelength of 680 nm, 720 nm, 760 nm, or 780 nm, the objective lens 70 has an effective numerical aperture of about 0.63, 0.66, 0.7, or 0.72 with respect to the first optical disk 40a. Also, when the light source 50 emits light having a wavelength between 750–780 nm, the objective lens 70 preferably has an effective numerical aperture of 0.7 or more with respect to a DVD and 0.53 or less with respect to a CD. For example, when the light source 50 emits light having a wavelength of 760±10 nm, the objective lens 70 preferably has an effective numerical aperture of 0.7 with respect to a DVD and 0.53 with respect to a CD.

Here, FIG. 2 shows a case in which the objective lens 70 having the annular lens area 73 having an aspherical shape described with reference to FIG. 6A is used. In particular, in FIG. 2, the objective lens 70 is schematically illustrated to show the focus of the light according to the incident areas. Also, in FIGS. 2 and 6A through 7B, the light incident surface of the second optical disk 40b is disposed closer to the objective lens 70 than the light incident surface of the first optical disk 40a. This is to show a difference in a distance between the objective lens 70 and the light incident surface of the first optical disk 40a and a distance between the objective lens 70 and the light incident surface of the second optical disk 40b (i.e., a working distance difference). In an actual system, the light incident surfaces of the first and second optical disks are located at the same position, and when the second optical disk 40b is used, the objective lens 70 is driven by an actuator to be moved closer to the second optical disk 40b than in the first optical disk 40a to be suitable for the working distance.

Figure 8:
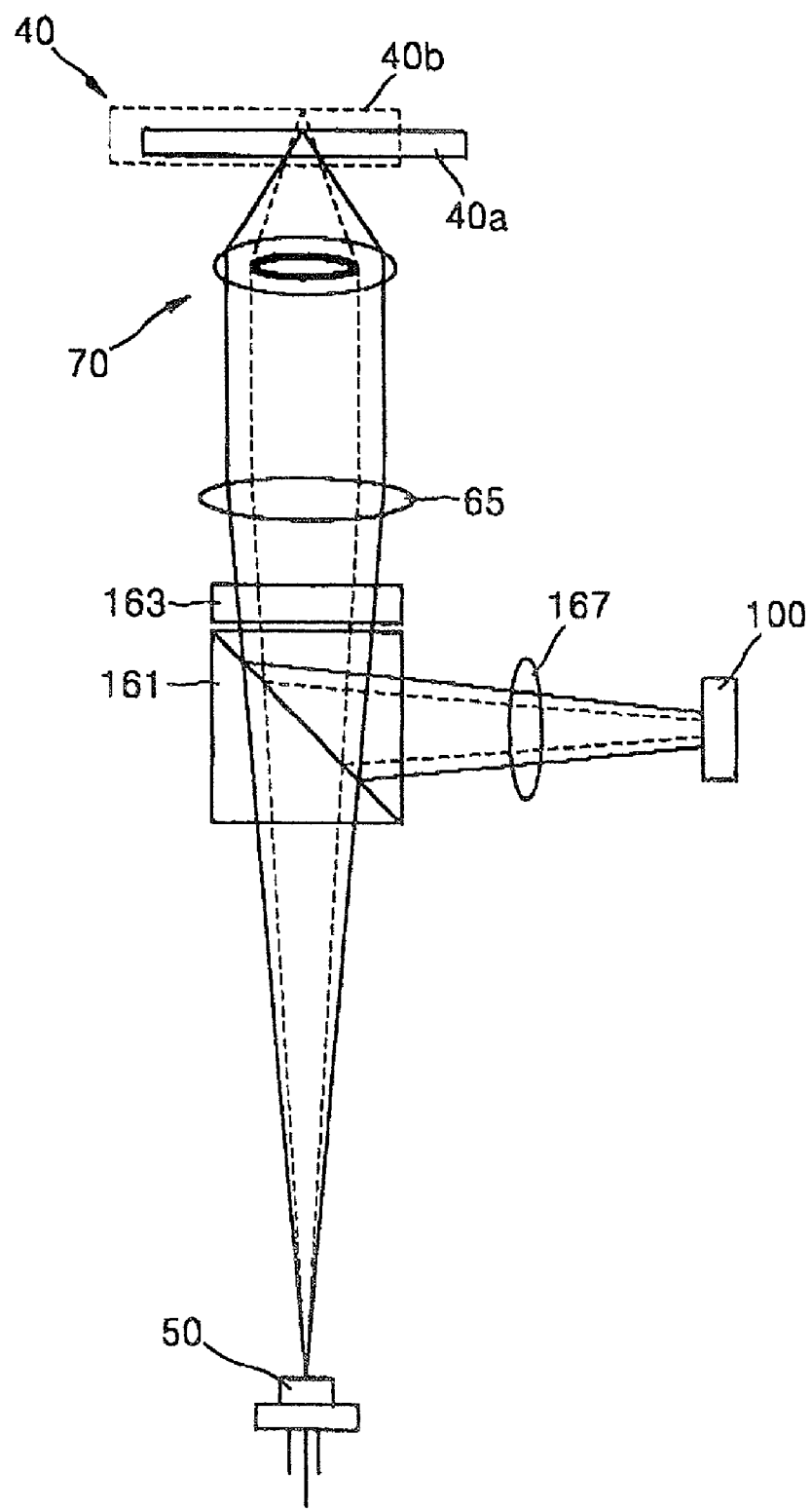
FIG. 8 schematically shows the optical arrangement of a compatible optical pickup device using a single light source according to another embodiment of the present invention.
Figure 9:
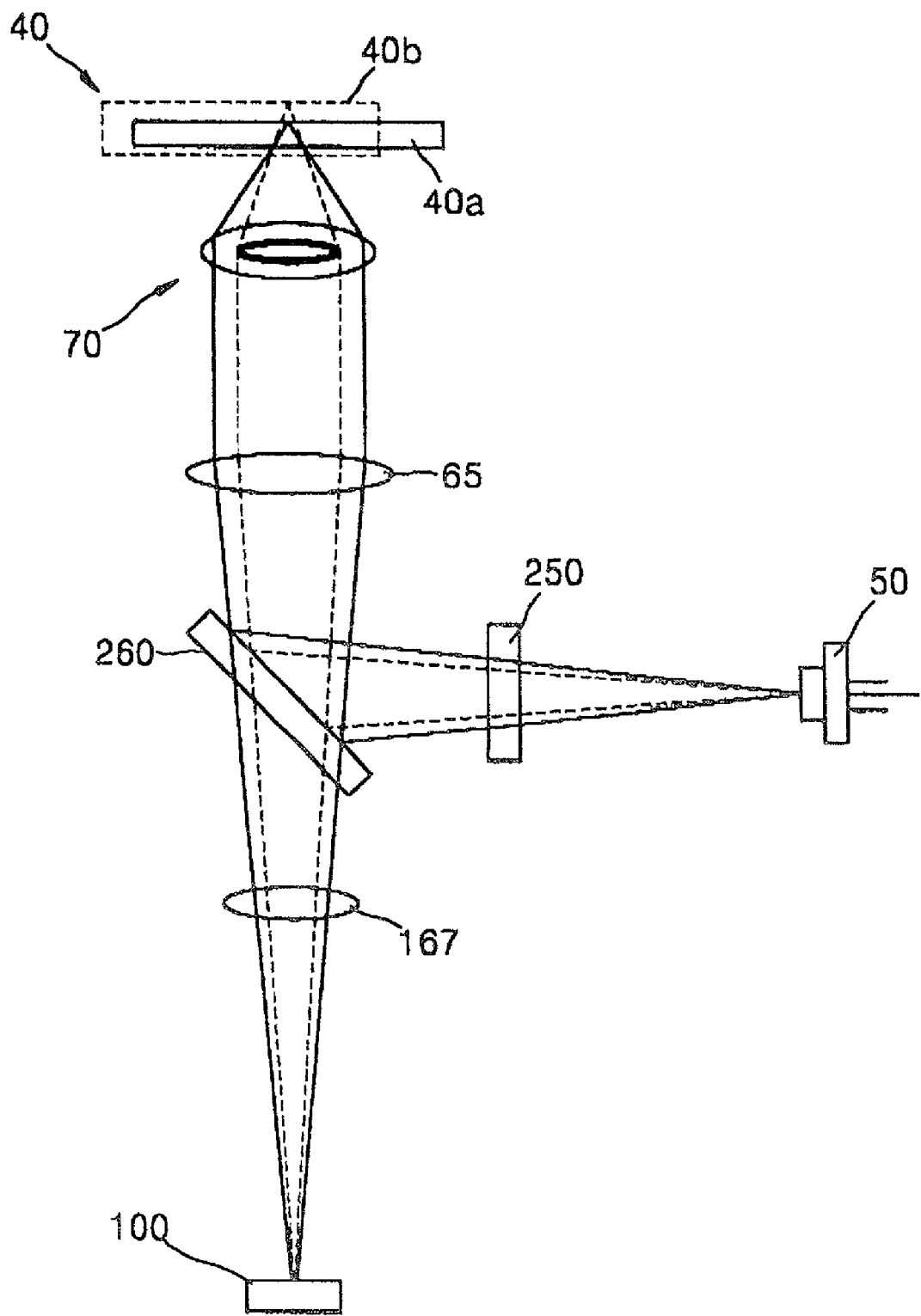
FIG. 9 schematically shows the optical arrangement of a compatible optical pickup device using a single light source according to yet another embodiment of the present invention.

According to additional embodiments of the present invention as shown in FIGS. 8 and 9, the compatible optical pickup device includes a beam splitter type optical path changer. As shown in the embodiment of the present invention in FIG. 8, the optical path changer is a polarizing beam splitter 161 disposed between the light source 50 and the objective lens 70 to transmit or reflect the incident light according to its polarization, and a wave plate 163 disposed between the polarizing beam splitter 161 and the objective lens 70 to convert the polarization of an incident light. As shown in the embodiment of the present invention in FIG. 9, the optical path changer is a beam splitter 260 disposed between the light source 50 and the objective lens 70 to transmit and reflect the incident light in a predetermined ratio. When the above beam splitter type optical path changer is provided, a sensing lens 167 is disposed on the optical path between the optical path changer and the photodetector 100 to focus the incident light so that it can be received by the photodetector 100.

In addition, the compatible optical pickup device according to the embodiment of the present invention shown in FIG. 9 further includes a diffraction element 250 disposed between the light source 50 and the optical path changer to diffract the light emitted from the light source 50. The diffraction element 250 is used to detect a DPP (differential push-pull) signal used for tracking when a DVD-RAM is reproduced, or to produce a tracking signal according to a three beams method when a CD is reproduced. The diffraction element 250 may be provided for the reproduction of each of a DVD-RAM and a CD. While not shown, it is understood that the diffraction element 250 may also be applied to the compatible optical pickup device shown in FIGS. 2 and 8.

Since the remaining members of FIGS. 8 and 9 are the same as those described with reference to FIG. 2, the same reference numerals are used therefor and detailed descriptions thereof will be omitted.

The compatible optical pickup device according to the present invention is not limited to the optical configuration as shown in FIGS. 2, 8 and 9, and of course, a variety of modifications thereto are possible.

Since the compatible optical pickup devices according to the embodiments of the present invention use a single light source 50 to emit light having a wavelength longer than 650 nm, and which is preferably, a wavelength between 680 nm through 780 nm, the system cost is lowered. Also, since the compatible optical pickup device according to the present invention includes an objective lens 70 designed to have an effective numeral aperture suitable for the first and second optical disks 40a and 40b in relation to the wavelength of the light emitted from the single light source 50, a light spot having an FWHM equal to or less than 0.72 μm is formed with respect to the first optical disk 40a, while a light spot having an FWHM greater than or equal to 0.8 μm is formed with respect to the second optical disk 40b. Thus, the compatible optical pickup device according to the present invention can compatibly reproduce/record the first and second optical disks 40a and 40b having different thicknesses. Of course, when a light source emits light having a wavelength greater than or equal to 750 nm is adopted as the light source 50, recording/reproduction of a presently commercialized CD-R and DVD-R is possible.

With reference to Table 1 and FIGS. 10A, 10B, 11A and 11B, properties of the objective lens 70 according to the present invention which is designed to compatibly reproduce/record the first and second optical disks 40a and 40b with respect to a 780 nm wavelength and a conventional objective lens for a DVD with respect to a 650 nm wavelength (not shown) (hereinafter referred to as an objective lens for 650 nm) are compared with each other.

Table 1 shows data values of the objective lens 70 of the present invention with respect to the first optical disk 40a (i.e., an example of design values for a DVD). The working distance is a distance between the surface of the objective lens 70 facing the optical disk 40 and the surface of the optical disk 40 on which light is incident. When the second optical disk 40b (i.e., a CD) is reproduced/recorded, the working distance is reduced by 0.3 mm. The aberration properties in the case of a DVD are shown in FIGS. 10A through 11B. A value of 0.04λ indicated by dotted lines of FIGS. 10A through 11B is allowable optical aberration (OPDrms) with respect to a DVD in the optical disk system.

TABLE 1

|  | Objective Lens (present invention) | Objective Lens (conventional) | Remarks |
| --- | --- | --- | --- |
| NA | 0.73 | 0.61 | |
| Working Distance (mm) | 1.3 | 1.8 | Reduced by 0.3 mm in the case of a CD |
| Effective Diameter (mm) | 4.09 | 4.03 | |
| Focal Distance (mm) | 2.8 | 3.3 | |
| Maximum Angle of Curved Surface of Lens | 55° | 51° | Possible to manufacture |
| OPDrms at Field Height of 1.0° | 0.033λ | 0.060λ | |
| OPDrms at Optical Disk Tilt of 0.35° | 0.041λ | 0.038λ | Allowable Optical Disk Tilt: 0.35° |

Referring to Table 1, the objective lens for 650 nm has a numerical aperture of 0.61 while the objective lens 70 of the present invention is designed to have a numerical aperture of 0.73. That is, the objective lens 70 of the present invention has a numerical aperture greater than that of the conventional objective lens for 650 nm. While the objective lens for 650 nm has a working distance of 1.8 mm, the objective lens 70 of the present invention has a working distance of 1.3 mm. Of course, when a CD is to be reproduced/recorded, the working distance is reduced by 0.3 mm as shown in FIGS. 2, and 6A through 9. The effective diameter of the objective lens for 650 nm is 4.03 mm and the focal distance is 3.3 mm, while the objective lens 70 of the present invention has an effective diameter of 4.09 mm and a focal distance of 2.8 mm. While a maximum angle of the curved surface of the objective lens for 650 nm is 51°, the objective lens 70 of the present invention has a maximum angle of the curved surface of 55°. The above maximum angle is a value which can be manufactured.

Figure 10A:
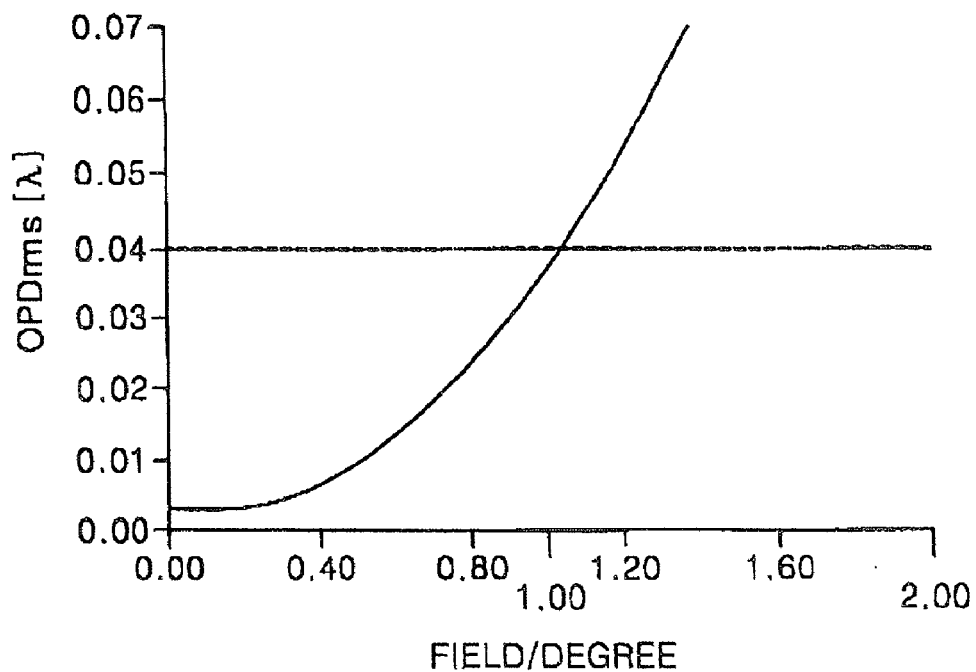
FIGS. 10A and 10B are graphs indicating an aberration characteristic according to the field of an incident beam between the objective lens according to an embodiment of the present invention and the conventional 650 nm objective lens.
Figure 10B:
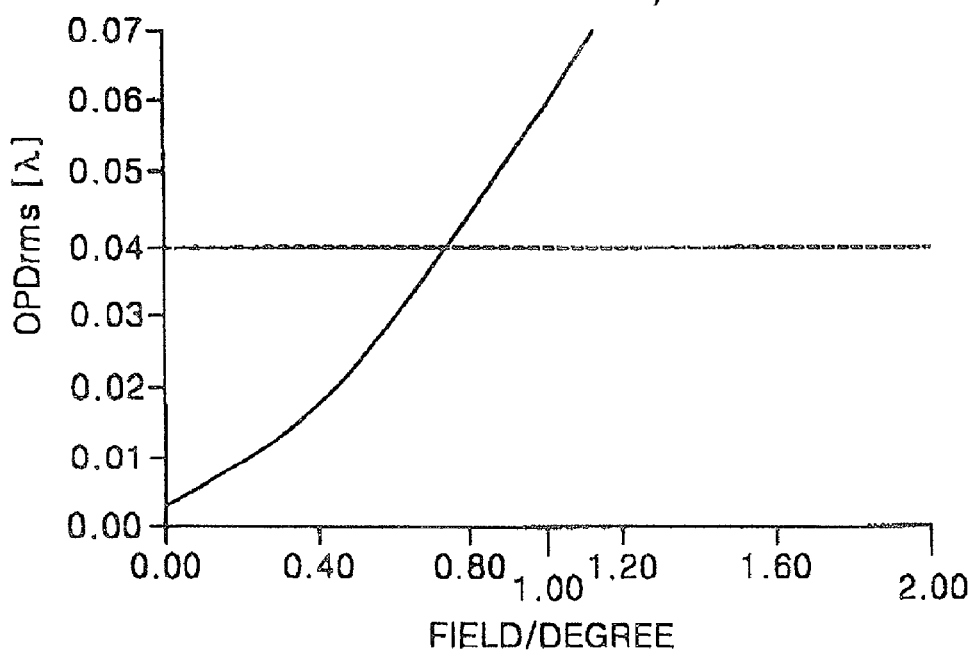

FIGS. 10A and 10B show the aberration properties according to incident beam fields of the objective lens 70 of the present invention and the objective lens for 650 nm designed according to the data of Table 1. As shown, the objective lens for 650 nm shows an OPDrms of 0.06λ with respect to a field height of 1.0°, while the objective lens 70 of the present invention shows an OPDrms of 0.033λ, exhibiting a superior field aberration as compared to that of the objective lens for 650 nm. Here, the field aberration is generated when the light emitted from the light source 50 is incident on the objective lens 70 at an inclined angle. Thus, an objective lens 70 preferably has a field aberration equal to or less than 0.04λ which is an allowable optical aberration value, with respect to a field height of 1° considering allowances in the assembly of the optical pickup device.

Figure 11A:
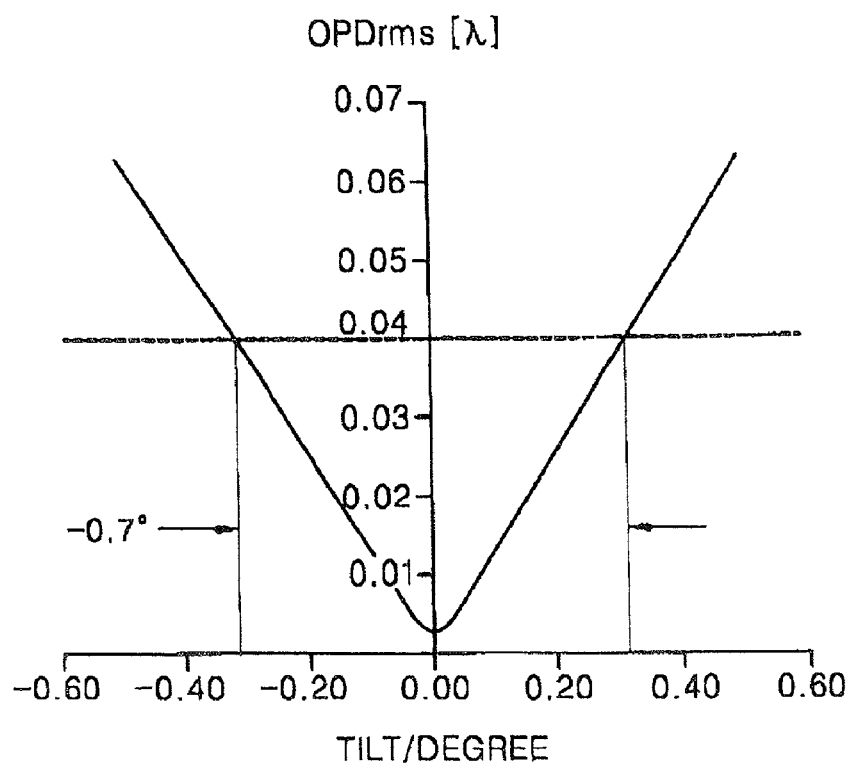
FIGS. 11A and 11B are graphs indicating an aberration characteristic according to the tilt of an optical disk between the objective lens according to an embodiment of the present invention and the conventional 650 nm objective lens.
Figure 11B:
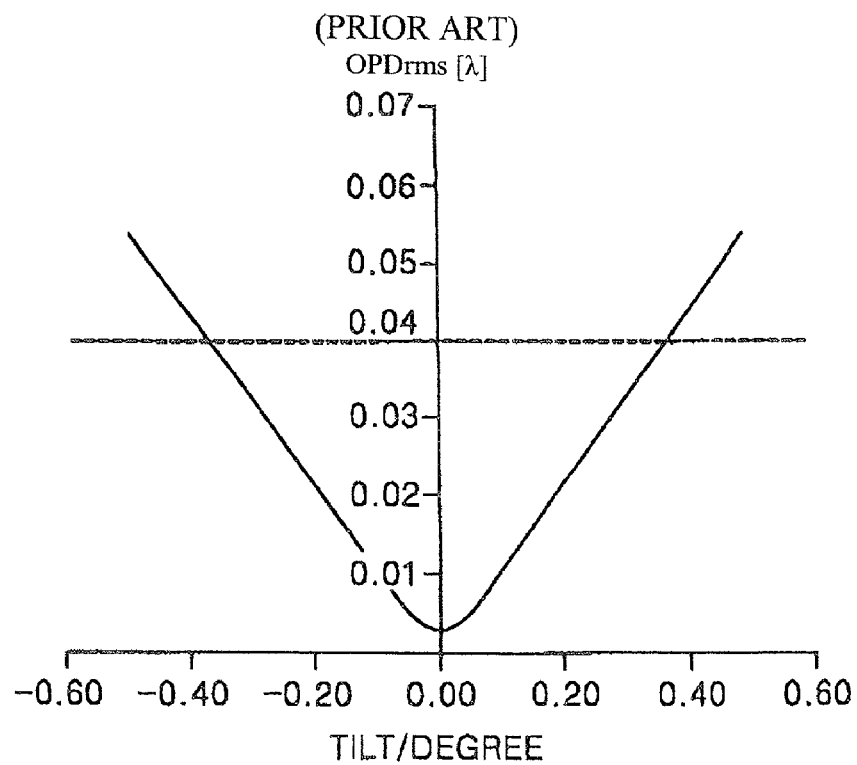

FIGS. 11A and 11B show the aberration properties according to the inclination of the optical disk 40 of the objective lens 70 of the present invention and the objective lens for 650 nm designed according to the data of Table 1, with respect to the tilt of the optical disk 40 in which an allowable tilt angle of an optical disk system is 0.35°. As shown, the objective lens 70 of the present invention has an OPDrms of 0.041λ which is similar to the OPDrms of 0.038λ exhibited by the objective lens for 650 nm.

As can be seen from the above, when a DVD is reproduced/recorded, the objective lens 70 of the present invention designed with respect to a wavelength of 780 nm exhibits an aberration property which is similar to or superior to the conventional objective lens for a DVD designed with respect to a wavelength of 650 nm. Also, the objective lens 70 of the present invention has a numerical aperture greater than that of the conventional objective lens for a DVD. Accordingly, even when light having a wavelength greater than 650 nm is used, a light spot having a small size suitable for reproducing/recording a DVD can be formed.

Thus, in a compatible optical pickup device using a single light source for a wavelength longer than 650 nm can compatibly reproduce/record not only the second optical disk 40*b* of a CD family, but also the first optical disk 40*a* of a DVD family.

Here, the size of a light spot is proportional to λ/NA (λ is a wavelength and NA is the numerical aperture of the objective lens 70). Thus, since the objective lens 70 of the present invention has numerical aperture greater than a typical objective lens for a DVD, even when light having a wavelength longer than 650 nm is used, a small light spot needed to reproduce/record the first optical disk 40*a* of a DVD family can be formed.

Figure 12:
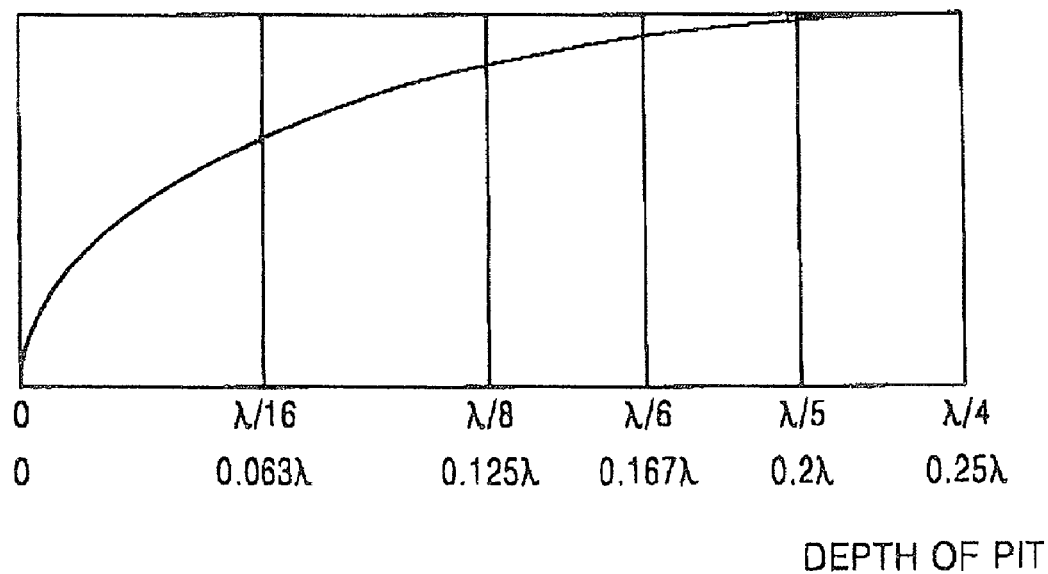
FIG. 12 is a graph showing a reproduction signal value according to the depth of a pit when a DVD is reproduced by the compatible optical pickup device according to an embodiment of the present invention.

FIG. 12 shows values of reproduction signals according to the depth of a pit when a DVD is reproduced by a compatible optical pickup device according to an embodiment of the present invention. In FIG. 12, the reproduction signals are obtained with respect to values of reproduction signals detected when a DVD having a pit having a depth of λ/6 is reproduced by a conventional DVD dedicated apparatus. As shown in FIG. 12, when the 780 nm light source 50 and the objective lens 70 having numerical aperture greater than that of the conventional objective lens for 650 nm with respect to a DVD are used, in the case in which the depth of a pit of a DVD is λ/6, since about 90% of the amplitude of the signal can be detected as compared to the signal by the conventional DVD dedicated apparatus, a DVD can be reproduced.

As described above, since the compatible optical pickup device according to the present invention includes an inexpensive single light source to emit light having a wavelength longer than 650 nm and an objective lens, designed in relation to the wavelength of the light emitted from the light source to form a light spot having an FWHM equal to or less than 0.72 μm with respect to an optical disk of a DVD family and a light spot having an FWHM greater than or equal to 0.8 μm with respect to an optical disk of a CD family, it has both an inexpensive and simple structure and can compatibly reproduce/record an optical disk of both the CD and DVD family.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A compatible optical pickup device to receive first and second optical disks having different thicknesses, comprising:
   a light source to emit a light having a wavelength longer than 650 nm;
   an objective lens having a near axis area, a ring type annular lens area, and a far axis area with respect to an apex, said objective lens being arranged:
      to focus the light emitted from said light source to form a first light spot when the first optical disk, which is relatively thin, is received, and a second light spot when the second optical disk, which is relatively thick, is received, and
      the first light spot having an FWHM (full width at half maximum) less than or equal to 0.72 μm with respect to the first optical disk, and the second light spot having an FWHM greater than or equal to 0.8 μm with respect to the second optical disk;
   an optical path changer arranged on an optical path between said light source and said objective lens, to selectively change a proceeding path of incident light; and
   a photo-detector arranged to receive light reflected by the received one of the first and second optical disks and having passed through said objective lens and said optical path changer, and to detect an information signal and/or an error signal.

2. The device as claimed in claim 1, wherein the first optical disk is an optical disk of a DVD family, and the second optical disk is an optical disk of a CD family.

3. The device as claimed in claim 1, wherein said light source emits the light having a wavelength between 680–780 nm.

4. The device as claimed in claim 3, wherein said objective lens has an effective numerical aperture greater than or equal to 0.63 with respect to the first optical disk, and an effective numerical aperture less than or equal to 0.53 with respect to the second optical disk.

5. The device as claimed in claim 1, wherein said light source emits light having a wavelength between 750–770 nm.

6. The device as claimed in claim 5, wherein said objective lens has an effective numerical aperture greater than or equal to 0.7 with respect to the first optical disk, which is relatively thin, and an effective numerical aperture less than or equal to 0.53 with respect to the second optical disk, which is relatively thick.

7. The device as claimed in claim 1, wherein said objective lens has an effective numerical aperture greater than or equal to 0.7 with respect to the first optical disk, which is relatively thin, and an effective numerical aperture less than or equal to 0.53 with respect to the second optical disk, which is relatively thick.

8. The device as claimed in claim 1, wherein the ring-type annular lens area of said objective lens is optimized to the second optical disk so that,
   when the first optical disk is to be reproduced/recorded, the light that forms the first light spot passes through the near axis area and the far axis area and is focused on an information recording surface of the first optical disk, and
   when the second optical disk is to be reproduced/recorded, the light that forms the second light spot passes through the near axis area and the annular lens area and is focused on the information recording surface of the second optical disk.

9. The device as claimed in claim 4, wherein the ring-type annular lens area of said objective lens is optimized to the second optical disk so that,
   when the first optical disk is to be reproduced/recorded, the light that forms the first light spot passes through the near axis area and the far axis area and is focused on an information recording surface of the first optical disk, and
   when the second optical disk is to be reproduced/recorded, the light that forms the second light spot passes through the near axis area and the annular lens area and is focused on the information recording surface of the second optical disk.

10. The device as claimed in claim 6, wherein the ring-type annular lens area of said objective lens is optimized to the second optical disk so that,
   when the first optical disk is to be reproduced/recorded, the light that forms the first light spot passes through the near axis area and the far axis area and is focused on an information recording surface of the first optical disk, and when the second optical disk is to be reproduced/recorded, the light that forms the second light spot passes through the near axis area and the annular lens area and is focused on the information recording surface of the second optical disk.

11. The device as claimed in claim 7, wherein the ring-type annular lens area of said objective lens is optimized to the second optical disk so that, when the first optical disk is to be reproduced/recorded, the light that forms the first light spot passes through the near axis area and the far axis area and is focused on an information recording surface of the first optical disk, and when the second optical disk is to be reproduced/recorded, the light that forms the second light spot passes through the near axis area and the annular lens area and is focused on the information recording surface of the second optical disk.

12. The device as claimed in claim 1, wherein said light source comprises an edge emitting laser or a vertical cavity surface emitting laser, and said optical path changer comprises:

a polarization hologram element to diffract the incident light to a $0^{th}$ order ray, or $+1^{st}$ order and/or $-1^{st}$ order rays according to a linear polarization component thereof; and a wave plate to change the linear polarization of the incident light.

13. The device as claimed in claim 1, wherein said light source comprises an edge emitting laser or a vertical cavity surface emitting laser, and said optical path changer comprises a beam splitter arranged between said light source and said objective lens to transmit and/or reflect incident light.

14. The device as claimed in claim 13, wherein the beam splitter transmits or reflects the incident light according to a polarization of the incident light, and further comprising a wave plate arranged between the beam splitter and said objective lens to change the polarization of the incident light.

15. The device as claimed in claim 1, further comprising a collimating lens on an optical path between said optical path changer and said objective lens.

16. An optical pickup device that is compatible with first and second optical disks having different thicknesses, comprising:

a light source to emit a light having a wavelength longer than 650 nm;

an objective lens to receive the light and is designed in relation to the wavelength to form:

a first light spot having a FWHM (full width at half maximum) that is less than or equal to 0.72 μm when the first optical disk is received, and a second light spot having a FWHM that is greater than or equal to 0.8 μm when the second optical disk is received;

a photo-detector arranged to receive light reflected by the received one of the first and second optical disks through said objective lens to detect a signal; and an optical path changer disposed between said light source and said objective lens to direct:

the light from said light source to said objective lens along a first optical path, and the reflected light from said objective lens to said photo-detector along a second optical path different than the first optical path, wherein the optical pickup device records/reproduces data to/from the received one of the first and second optical disks.

17. The optical pickup of claim 16, wherein the first optical disk is an optical disk of a DVD family, and the second optical disk is an optical disk of a CD family.

* * * * *